US010963226B2

(12) United States Patent
Aggarwal et al.

(10) Patent No.: US 10,963,226 B2
(45) Date of Patent: Mar. 30, 2021

(54) GENERATING COMPILABLE CODE FROM UNCOMPILABLE CODE

(71) Applicant: Aspiring Minds Assessment Private Limited, New Delhi (IN)

(72) Inventors: Varun Aggarwal, Haryana (IN); Rohit Takhar, Haryana (IN)

(73) Assignee: Aspiring Minds Assessment Private Limited, New Delhi (IN)

( * ) Notice: Subject to any disclaimer, the term of this patent is extended or adjusted under 35 U.S.C. 154(b) by 0 days.

(21) Appl. No.: 16/171,043

(22) Filed: Oct. 25, 2018

(65) Prior Publication Data

US 2019/0121621 A1    Apr. 25, 2019

(30) Foreign Application Priority Data

Oct. 25, 2017  (IN) .............................. 201711037678

(51) Int. Cl.
*G06F 8/36* (2018.01)
*G06F 8/41* (2018.01)
*G06N 20/00* (2019.01)

(52) U.S. Cl.
CPC ............... *G06F 8/36* (2013.01); *G06F 8/42* (2013.01); *G06F 8/427* (2013.01); *G06N 20/00* (2019.01)

(58) Field of Classification Search
CPC ..... G06F 8/30; G06F 8/33; G06F 8/37; G06F 8/41; G06F 8/75; G06F 17/27
See application file for complete search history.

(56) References Cited

U.S. PATENT DOCUMENTS

| | | | | |
|---|---|---|---|---|
| 8,522,083 | B1* | 8/2013 | Cohen ................. | G06F 11/3696 714/38.1 |
| 8,856,725 | B1* | 10/2014 | Anderson ................ | G06F 8/75 717/103 |
| 9,898,387 | B2* | 2/2018 | Rodmell ................... | G06F 8/33 |
| 10,585,780 | B2* | 3/2020 | Woulfe ............... | G06F 11/3624 |
| 2004/0003335 | A1* | 1/2004 | Gertz .................... | H03M 13/47 714/758 |
| 2008/0288512 | A1* | 11/2008 | Tung ......................... | G06F 8/20 |
| 2009/0070734 | A1* | 3/2009 | Dixon ....................... | G06F 8/71 717/102 |
| 2011/0252394 | A1* | 10/2011 | Sharma ............... | G06F 11/3616 717/101 |
| 2015/0135166 | A1* | 5/2015 | Tarlow ...................... | G06F 8/34 717/125 |
| 2017/0212829 | A1* | 7/2017 | Bales .................. | G06F 11/3664 |
| 2017/0269907 | A1* | 9/2017 | Goetz ....................... | G06F 8/51 |
| 2017/0278421 | A1* | 9/2017 | Du ........................... | G09B 7/02 |

\* cited by examiner

*Primary Examiner* — Duy Khuong T Nguyen
(74) *Attorney, Agent, or Firm* — IP Spring

(57) ABSTRACT

A method to generate compilable code from uncompilable code. The method includes receiving uncompilable code. The method further includes generating compilable code by one or more of (1) identifying and correcting syntax errors in the uncompilable code and (2) using an n-gram based token prediction model. The method further includes extracting features from the compilable code. The method further includes generating a machine learning model that recognizes patterns from extracted features in the compilable code.

18 Claims, 6 Drawing Sheets

GENERATING COMPILABLE CODE FROM UNCOMPILABLE CODE

CROSS REFERENCE TO RELATED APPLICATIONS

This application claims the benefit of Indian Provisional Patent Application No. 201711037678, entitled "System to Grade and Provide Feedback on Programs That Do Not Compile," filed Oct. 25, 2017, which is incorporated by reference in its entirety.

BACKGROUND

The specification relates to a feedback application that generates compilable code from uncompilable code.

When a programmer is learning how to code, it is more important that the programmer show an ability to solve a programming problem using the correct logic, which is also known as an algorithmic approach, as opposed to the ability to follow and reproduce the syntax of a language. Syntax can be learned quickly for a new programming language, but it is more difficult to develop an ability to code with the correct logic.

Several automated systems for testing coding skills and providing feedback have been developed. One method for evaluation of the code uses test cases, which neither provides good judgment to the evaluator nor proper actionable feedback to the candidate. Another method provides a grade on the logical correctness of a program according to a rubric. However, none of these methods handle code that does not compile. As a result, a programmer will not receive feedback on how to improve the code. Even worse, a programmer may miss out on grades or job opportunities.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments generally relate to a computer-implemented method to generate compilable code from uncompilable code. The method includes receiving uncompilable code. The method further includes generating compilable code by one or more of (1) identifying and correcting syntax errors in the uncompilable code and (2) using an n-gram based token prediction model. The method further includes extracting features from the compilable code. The method further includes generating a machine learning model that recognizes patterns from extracted features in the compilable code.

In some embodiments, using the n-gram based token prediction model includes: determining whether a first statement in the uncompilable code has a compiler error or is uncompilable, wherein a determination is performed by at least one of the machine learning model and a compiler that identifies a line that includes the first statement, predicting a corrected statement based on other statements in the uncompilable code, and responsive to the corrected statement making the uncompilable code compilable, accepting the corrected statement. In some embodiments, the machine learning model is a third machine learning model, determining whether the first statement in the uncompilable code has a compiler error is performed by a first machine learning model, and predicting the corrected statement is performed by a second machine learning model. In some embodiments, a parse tree or a symbol table (ST) is generated to extract features from the uncompilable code. In some embodiments, the parse tree or the ST is created from the uncompilable code, a rule relaxation method is used to accept or reinterpret grammatically incorrect statements, and the grammatically incorrect statements that are not parseable are skipped. In some embodiments, the extracted features describe one or more keywords, expressions, expression dependency, and control context. In some embodiments, the machine learning model is generated by labeling the compilable code or comparing the extracted features in the compilable code to labeled high-quality compilable code. In some embodiments, the method further includes generating a score based on the machine learning model that describes how correct a logic of the uncompilable code is in solving a problem. In some embodiments, the method further includes generating semantic feedback based on the score and the machine learning model, wherein the semantic feedback includes the score and a description of one or more of logical correctness of the uncompilable code, an algorithmic approach used by the uncompilable code, a programming style of the uncompilable code, a maintainability of the uncompilable code, a recommendation for how to correct logic of the uncompilable code, correct code, a number of compiler errors, a number of test cases, a recommendation to make the uncompilable code compilable, and an identification of one or more lines in the uncompilable code that are uncompilable and one or more alternate lines to correct the uncompilable code.

In some embodiments, non-transitory computer storage medium with instructions stored thereon that, when executed by one or more computers, cause the one or more computers to perform operations, the operations comprising: receiving uncompilable code, parsing the uncompilable code, extracting features from the uncompilable code, and generating a machine learning model that recognizes patterns from extracted features in the uncompilable code.

In some embodiments, the operations further comprise: generating a parse tree or a symbol table (ST) and wherein extracting features from the uncompilable code includes traversing the parse tree or the ST to extract features from the uncompilable code. In some embodiments, the parse tree or the ST is used to identify correct statements in the syntactically corrected code, use a rule relaxation method to accept or reinterpret grammatically incorrect statements, and skip the grammatically incorrect statements that are not parseable. In some embodiments, the operations further comprise: generating a score based on the machine learning model that describes how correct a logic of the uncompilable code is in solving a problem. In some embodiments, the operations further comprise: generating semantic feedback based on the score and the machine learning model, wherein the semantic feedback includes the score and a description of one or more of logical correctness of the uncompilable code, an algorithmic approach used by the uncompilable code, a programming style of the uncompilable code, a maintainability of the uncompilable code, a recommendation for how to correct logic of the uncompilable code, correct code, a number of compiler errors, a number of test cases, a recommendation to make the uncompilable code compilable, and an identification of one or more lines in the uncompilable code that are uncompilable and one or more alternate lines to correct the uncompilable code.

Other aspects may include corresponding methods, systems, apparatus, and computer program products.

The systems and methods described herein advantageously generate compilable code from uncompilable code. As a result, the compilable code functions, the compilable code my take up less memory, and the compilable code works more efficiently than uncompilable code. Uncompilable code may be properly assessed to discover the intent of the programmer. In some embodiments, the systems and methods generate semantic feedback that addresses the logic of the code to help the programmer learn how to improve their code.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System

Figure 1:
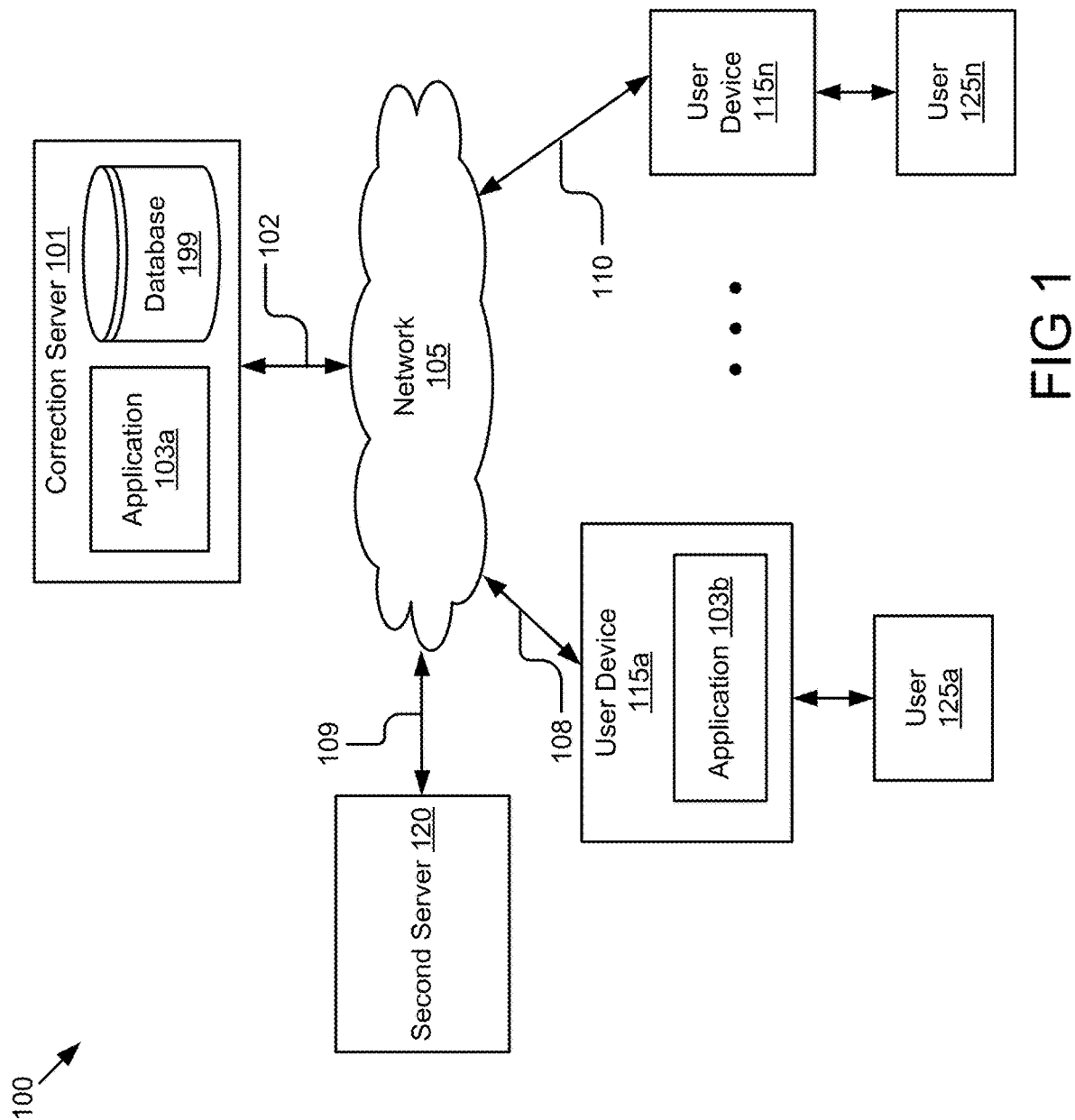
FIG. 1 illustrates a block diagram of an example system that generates compilable and/or parseable code from uncompilable code according to some embodiments.

FIG. 1 illustrates a block diagram of an example system 100 that corrects uncompilable programs to make them compilable and/or parseable. The illustrated system 100 includes a correction server 101, user devices 115a, 115n, a second server 120, and a network 105. Users 125a, 125n may be associated with respective user devices 115a, 115n. In some embodiments, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The correction server 101 may include a processor, a memory, and network communication capabilities. In some embodiments, the correction server 101 is a hardware server. The correction server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the correction server 101 sends and receives data to and from one or more of the user devices 115a, 115n and the second server 120 via the network 105. The correction server 101 may include a feedback application 103a and a database 199. The database 199 may be used as cloud storage.

The feedback application 103a may be code and routines operable to generate compilable code from uncompilable code. In some embodiments, the feedback application 103a receives uncompilable code, generates compilable code by one or more of (1) identifying and correcting syntax errors in the uncompilable code and (2) using an n-gram based token prediction model and/or generates parseable code, extracts features from the compilable code or the uncompilable code, and generates a machine learning model that recognizes patterns from extracted features in the compilable code. In some embodiments, the feedback application 103a may be implemented using hardware including a field-programmable gate array (FPGA) or an application-specific integrated circuit (ASIC). In some embodiments, the feedback application 103a may be implemented using a combination of hardware and software.

The database 199 may include information related to the operation of the feedback application 103. For example, the database 199 may store examples of high-quality compilable code, a machine learning model, uncompilable code, compilable code generated from the uncompilable code, etc. The database 199 may be used as cloud storage.

The user device 115 may be a computing device that includes a memory and a hardware processor. For example, the user device may include a desktop computer, a mobile device, a tablet computer, a mobile telephone, a wearable device, a mobile device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, the feedback application 103b may be stored on a user device 115a. The feedback application 103 may include a thin-client feedback application 103b stored on the user device 115a and a feedback application 103a that is stored on the correction server 101. For example, the feedback application 103b stored on the user device 115a may receive code including uncompilable code from a programmer. The user device 115a may transmit the code to the feedback application 103a stored on the correction server 101, which generates compilable and/or parseable code from the uncompilable code, scores the compilable code, and generates feedback. The feedback application 103a may transmit graphical data for the feedback to the user device 115, which displays the feedback on a display of the user device 115.

The second server 120 may include a processor, a memory, and network communication capabilities. The second server 120 may access the network 105 via signal line 109. The second server 120 may provide data to the feedback application 103. For example, the second server 120 may provide examples of high-quality compilable code.

In the illustrated implementation, the entities of the system 100 are communicatively coupled via a network 105.

The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the correction server 101, in practice one or more networks 105 may be coupled to these entities.

Example Computing Device

Figure 2:
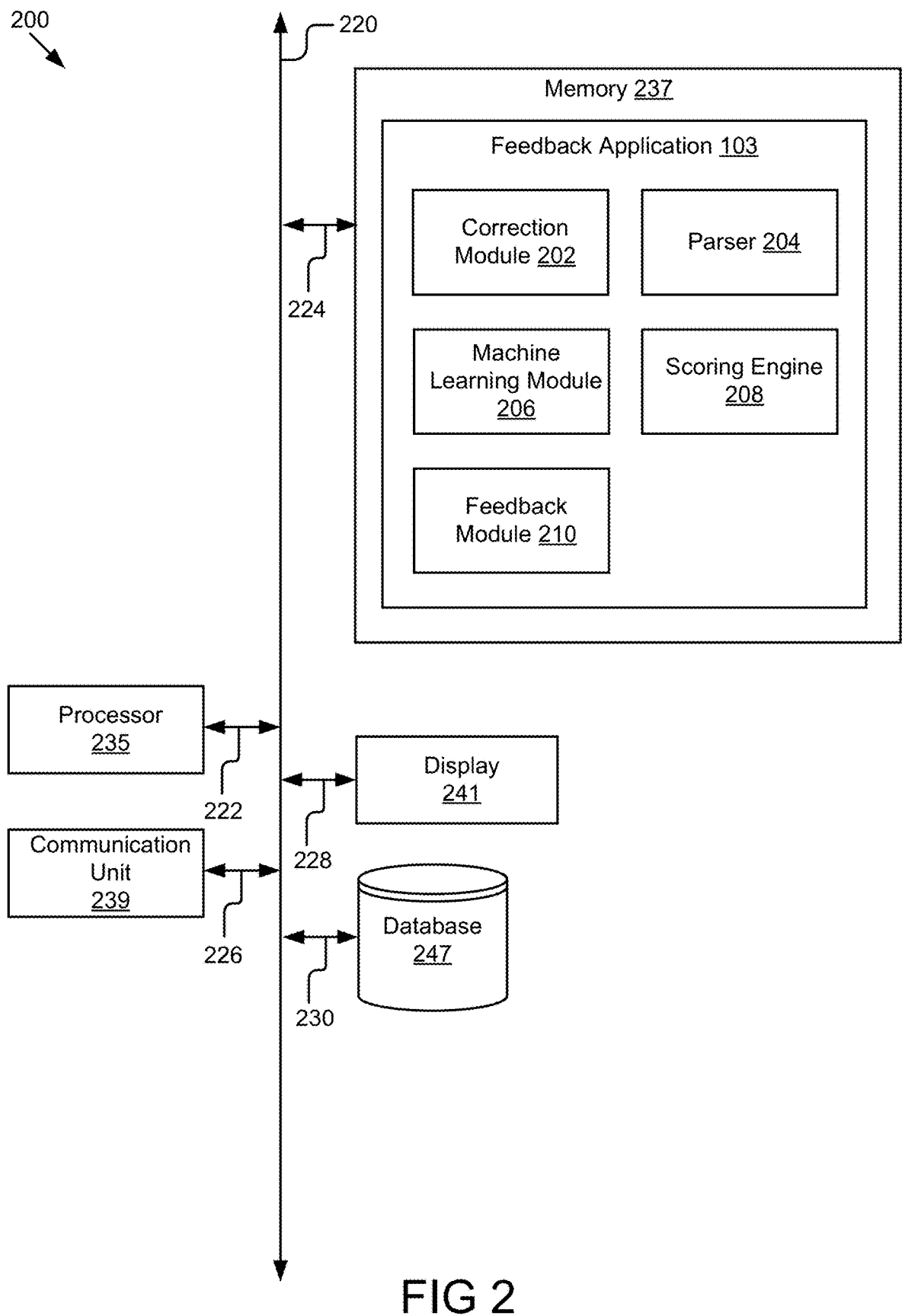
FIG. 2 illustrates a block diagram of an example computing device that generates compilable and/or parseable code from uncompilable code according to some embodiments.

FIG. 2 illustrates a block diagram of an example computing device 200 that generates compilable and/or parseable code from uncompilable code. The computing device 200 may be a correction server 101 or a user device 115. The computing device 200 may include a processor 235, a memory 237, a communication unit 239, a display 241, and a database 247. Additional components may be present or some of the previous components may be omitted depending on the type of computing device 200. For example, if the computing device 200 is the correction server 101, the computing device 200 may not include the display 241. A feedback application 103 may be stored in the memory 237. In some embodiments, the computing device 200 may include other components not listed here, such as a battery, a sensor, etc. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the feedback application 103, which is described in greater detail below. The memory 237 is coupled to the bus 220 for communication with the other components via signal line 224.

The communication unit 239 transmits and receives data to and from at least one of the user device 115 and the correction server 101 depending upon where the feedback application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the correction server 101, depending on where the feedback application 103 may be stored. In some embodiments, the communication unit 239 includes a wireless transceiver for exchanging data with the user device 115, correction server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the feedback application 103. For example, the display 241 may render graphics to display feedback about code submitted by a programmer. The display 241 is coupled to the bus 220 for communication with the other components via signal line 228.

The database 247 may be a non-transitory computer-readable storage medium that stores data that provides the functionality described herein. In embodiments where the computing device 200 is the correction server 101, the database 247 may include the database 199 in FIG. 1. The database 247 may be a DRAM device, a SRAM device, flash memory or some other memory device. In some embodiments, the database 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The database 247 is coupled to the bus 220 for communication with the other components via signal line 230.

The feedback application 103 may include a correction module 202, a parser 204, a machine learning module 206, a scoring engine 208, and a feedback module 210.

The correction module 202 corrects uncompilable code. In some embodiments, the correction module 202 includes a set of instructions executable by the processor 235 to correct the uncompilable code. In some embodiments, the correction module 202 is stored in the memory 237 of the computing device 200 and can be accessible and executable by the processor 235.

The correction module 202 may receive uncompilable code from a programmer. The uncompilable code may be written in any programming language, such as C, C++, Java, Python, C#, JavaScript, assembly, perl, ruby, SQL, visual basic, etc. The uncompilable code may be part of a program that also includes some compilable code or the entire program may be considered uncompilable code because one uncompilable portion of the program may render the entire program uncompilable. For purposes of this application, the program is described as uncompilable code, even though portions of the program may be compilable. The uncompilable code may be submitted as part of a programming class, a job interview, or any other purpose. In some embodiments, the correction module 202 identifies locations within the uncompilable code where a compilation error occurs before correcting the uncompilable code.

The correction module 202 determines how the programmer intended the uncompilable code to work by fixing failures in the uncompilable code to adhere to grammar rules and syntax rules of the programming language. The correction module 202 generates compilable code by: (1) identifying and correcting corrects syntax errors in the uncompilable code; and (2) using an n-gram based token prediction model. These approaches are referred to as the make compilable method below.

In some embodiments, the correction module 202 corrects syntax errors code by fixing common errors, for example, by inserting a semicolon, balancing parentheses, declaring undeclared variables, or adding a return statement. The correction module 202 may perform multiple passes of the uncompilable code to fix the grammar rules and the syntax errors until the uncompilable code is compilable.

In some embodiments, the correction module 202 generates compilable code by predicting the correct line at the position of a compilation error based on previous keywords. For example, the correction module 202 may generate compilable code that includes insertion of a data type, a variable name, etc. and not make changes that introduce new logical units, such as operators, expressions, or control structures.

The correction module 202 may use an n-gram based token prediction model to predict the correct line of code at the position of the compilation error. Other models may be used to generate the compilable code, such as a long-short term memory (LSTM) unit of a recurrent neural network (RNN). In some embodiments, the token prediction model may include a first machine learning model that determines whether a first statement has a compiler error or is uncompilable. Alternatively or additionally, a compiler may identify a line that includes the first statement. The token prediction model may include a second machine learning model that predicts a corrected statement based on other statements in the uncompilable code. The first machine learning model and the second machine learning model may be generated by the machine learning module 206 discussed in greater detail below.

If the corrected statement makes the uncompilable code compilable, the correction module 202 may accept the corrected statement. If the uncompilable code is still uncompilable with the corrected statement, the correction module 202 may continue to try subsequent predicted lines until the uncompilable code is compilable. In some embodiments, the correction module 202 attempts to make the uncompilable code compilable by trying the subsequent statements either until the uncompilable code is compilable or a threshold number of attempts have occurred. If the subsequent statements fail to make the uncompilable code compilable after the threshold number of attempts have occurred, the correction module 202 may ignore the portion of the uncompilable code that fails to become compilable.

The parser 204 applies a rule relaxation method to extract features from the uncompilable code. In some embodiments, the parser 204 includes a set of instructions executable by the processor 235 to extract features from the uncompilable code. In some embodiments, the parser 204 is stored in the memory 237 of the computing device 200 and can be accessible and executable by the processor 235.

In some embodiments, the parser 204 applies the rule relaxation method after the correction module 202 generates the compilable code. In other embodiments, the parser 204 applies the rule relaxation method to the uncompilable code if the correction module 202 is not able to generate the compilable code. In some embodiments, the parser 204 parses uncompilable code using the rule relaxation method. Although the parser 204 is described below as performing actions on uncompilable code, the parser 204 may be understood to apply the same steps to compilable code.

In some embodiments, the parser 204 generates a parse tree, an abstract syntax tree (AST), or a symbol table (ST). The parser 204 may not generate an AST for uncompilable code. The parser 204 traverses the abstract syntax tree to extract features from the uncompilable code. A typical compiler performs several steps: tokenization, parsing based on grammar, type checking, linking, and optimization. The parser 204 relaxes the rules used in the various compilation steps to generate the parse tree or the ST for the uncompilable code. In some embodiments, the parser 204 identifies correct statements in the uncompilable code, uses a rule relaxation method to accept or reinterpret grammatically incorrect statements, and skips the grammatically incorrect statements that are not parseable.

When a compiler performs tokenization of code, it does not generally lead to an error. Non-meaningful tokens get identifies as potentially variable/function names to be disambiguated later. For instance, an undeclared variable, or a variable with an operation not matching its data type, are accepted at this stage. A spelling error in a token, such as rturn in rturn flag is wrongly identified as a class identifier, whose definition will be expected to be linked in later steps.

In the parsing step, errors occur when the code violates the grammar rules. The parser 204 skips the statements in the uncompilable code that violate the grammar rules. For instance, the parser 204 skips the statement int [ ] arr=new int[ ]. The parser 204 builds an Imperfect AST in the parsing steps that captures the good part of the code (e.g., the parts of the code that do not violate grammar rules or other rules) while skipping the parts of the code that are uncompilable. In some examples, the parser 204 skips around 6.2% of the uncompilable code.

When a compiler performs type checking or linking steps, the compiler identifies errors in situations where operations of variable or declarations of variables do not match. The parser 204 performs a rule relaxation method by identifying that a declaration in the uncompilable code is wrong and, responsive to the declaration being wrong, ignoring the wrong declaration and assuming missing declarations. Continuing with the example above, the operation is accepted even if the data type doesn't match, so the usage of undeclared variables and rturn is considered a class. The parser 204 creates an Imperfect ST for the uncompilable code.

While the corrections performed by the correction module 202 may be better at inferring an intent of the programmer by correcting the non-understandable statements in the uncompilable code, if the correction module 202 cannot correct the statements in the uncompilable code, the correction module 202 fails. In some examples, the correction module 202 fails with 52% of the code. Conversely, the parser 204 may skip or misconstrue portions of the uncompilable code, but it can still parse a significant portion of the uncompilable code. In some examples, the parser 204 parses 95% of the uncompilable code. In some embodiments, both the correction module 202 and the parser 204 perform actions on the uncompilable code to maximize the advantages of both approaches to correcting and parsing the uncompilable code.

The features extracted by the parser 204 may describe keywords, expressions, expression dependency, and control context. The description of keywords may include a count of all keywords, tokens, operators, etc., such as the number of times a "*" operator appears or loop and conditional tokens, such as when "for" and "if" appear. The description of the expressions may include and abstraction of the expression. For example, y−x %2 is abstracted to a notation such as v:2::op:%::c:'2', which denotes an expression having two variables, one modulus operator, and the constant "2." The number of occurrences of each abstract expression are counted. The description of expression dependency may describe a data dependency that is captured when the variable in one expression is used in another expression. For example, the expression x<y, which contains a relational operator (<) and two variables is dependent on the expression y++, which contains a post increment operator (++) and one variable. This is denoted using the notation v:1::op:++ (←)v:2::op:relation. The occurrences of each dependency matching such abstractions is counted. This is repeated for each unique pair of dependencies that appear in a response. The control context may describe that separate counts are maintained for each of the three properties described above according to the control-context (loops and conditional statements) in which they appear. For example, an expression whose abstract notation matches v:2::op:%" "c"'2' is counted separately if it appears within an if statement as against a loop like a for or a while as against an if statement within a for.

The machine learning module 206 generates a machine learning model. In some embodiments, the machine learning module 206 includes a set of instructions executable by the processor 235 to generate the machine learning model. In some embodiments, the machine learning module 206 is stored in the memory 237 of the computing device 200 and can be accessible and executable by the processor 235.

In some embodiments, the machine learning module 206 generates multiple machine learning models to form an iterative process. For example, the machine learning module 206 may generate a first machine learning model that determines whether a first statement has a compiler error or is uncompilable. The machine learning module 206 may generate the first machine learning model based on training data that labels code as compilable or uncompilable in order to identify patterns in code that would cause it to be uncompilable. In some embodiments, the machine learning module 206 generates a second machine learning model that predicts a corrected statement based on other statements in the uncompilable code. The machine learning module 206 may generate the second machine learning model based on training data that labels code as compilable or uncompilable in order to identify patterns in code that would cause it to be uncompilable.

In some embodiments, the machine learning module 206 generates a third machine learning model that recognizes patterns from extracted features in the compilable code. The machine learning module may receive training data in the form of a set of labelled uncompilable code and features extracted from the uncompilable code after the uncompilable code was processed by the correction module 202 using the make compilable method, the parser 204 using the rule relaxation method, or a combination of the make compilable method and the rule relaxation method. The machine learning module 206 may generate the machine learning model using the extracted features.

In some embodiments, the machine learning module 206 receives training data in the form of labeled high-quality code where the high-quality code is compilable code that did not require modification to become compilable. The machine learning module 206 uses the labeled high-quality compilable code to generate the machine learning model. The machine learning model generated from the labeled compilable codes may be modified with certain corrections to perform as well as a machine learning model generated from the uncompilable code. The machine learning module 206 may reuse the machine learning model generated from the labeled compilable code on other other codes, such as uncompilable codes.

In some embodiments, the machine learning module 206 generates a machine learning model using an iterative process. For example, the machine learning module 206 may use training data that includes labeled high-quality compilable code to generate a machine learning model. The machine learning module 206 may perform an iterative process by reusing the machine learning model generated with labeled high-quality compilable code for an uncompilable code from a programmer. In some embodiments, this is best achieved by not using a number of test cases passed as a feature in training the machine learning model using the labeled high-quality compilable code. In some embodiments, the machine learning module 206 also monitors for a comparable correlation and a high MAE value because those are indicators of a systemic error that would result in a poorly working machine learning model.

The following is an example use case for developing machine learning models. The machine learning module 206 generates the machine learning model based on responses collected on the questions provided in Table 1 below.

TABLE 1

Sample size for different questions

| Question Name | Sid | #UC | #CC |
|---|---|---|---|
| countCacheMiss | 24 | 370 | 106 |
| balancedParentheses | 132 | 355 | 70 |
| grayCheck | 43 | 367 | 175 |
| transposeMultMatrix | 48 | 407 | 182 |
| eliminateVowelString | 62 | 392 | 182 |

The machine learning module 206 used linear regression, linear regression with $L_1$ regularization (LASSO), linear regression with $L_2$ regularization (Ridge regression), decision trees, random forests, and support vector machines (SVMs). The machine learning module 206 reports results for LASSO ($\alpha=1$) with $\lambda$ varied from 0 to 4. The machine learning module 206 determined that linear models worked best among all the techniques, indicating linearity in the inherent structure of the problem space. The reports for LASSO are described because it outperformed all other techniques.

The machine learning model that gave the best cross-validation (three-fold) correlation was selected. The machine learning model was trained on data from three problems (Sid 43, 48, 62), and tested on data from all five problems. For the problems used in training, the response set was split into a 70-30 train-test set. For the other two problems, all responses were used in the test set. The performance of the model on the unseen problem set helped demonstrate how well the models generalized to questions whose sample was not used in training. The Pearson correlation coefficient (r) and mean absolute error (MAE)

$$\left(\sum \frac{|ypred - y|}{n}\right)$$

as evaluation metrics to judge the performance of the machine learning models.

The machine learning module 206 compares the efficacy of various approaches based on choices made at different steps to determine: criteria #1 whether the make compilable method, the rule relaxation method, or a combination of the make compilable method and the rule relaxation method is more accurate in scoring the uncompilable code; criteria #2 how accurately the uncompilable code can be scored and how it compares to expert scoring engines and/or automatic scoring of compilable codes; and criteria #3 whether a machine learning model trained for compilable codes can be reused for uncompilable codes.

The machine learning module 206 performed an analysis using five programming problems. The problems were chosen such that the algorithms to solve the problems had varying complexities. A subset of programs written by programmers for the problems were scored by experts. The set included both compilable and uncompilable codes.

The machine learning module 206 generated separate machine learning models for the compilable codes and the uncompilable codes to predict expert scores. For the uncompilable codes, the machine learning module 206 built machine learning modules using each of the rule relaxation method and the make compatible method and compared their accuracy. The machine learning module 206 also determined that the models for compilable code could be reused for predicting scores for uncompilable code.

TABLE 2

Accuracy of models built using the RR and MC approach to grade uncompilable codes. Metrics: r and MAE.

| Sid | Sample Size | Sample Size (MC) | RR (all) r | RR (all) MAE | MC r | MC MAE | (RR MC set) r | (RR MC set) MAE |
|---|---|---|---|---|---|---|---|---|
| 24 | 370 | 171 | 0.71 | 0.52 | 0.78 | 0.44 | 0.71 | 0.51 |
| 132 | 355 | 165 | 0.70 | 0.43 | 0.63 | 0.45 | 0.65 | 0.44 |
| 43 | 367 | 175 | 0.72 | 0.47 | 0.86 | 0.25 | 0.78 | 0.49 |
| 48 | 407 | 220 | 0.66 | 0.50 | 0.65 | 0.54 | 0.72 | 0.43 |
| 62 | 392 | 198 | 0.59 | 0.65 | 0.74 | 0.55 | 0.58 | 0.68 |
| Mean | | | 0.68 | 0.52 | 0.73 | 0.45 | 0.69 | 0.51 |
| Median | | | 0.70 | 0.50 | 0.74 | 0.45 | 0.71 | 0.49 |

TABLE 3

Accuracy of models built using a sample of compilable codes to grade uncompilable codes. Metrics: r and MAE.

| | CC Model | | CC Model with dist. Fixed | | CC Model w/o TC and dist. Fixed | | Uncompilable | |
|---|---|---|---|---|---|---|---|---|
| Sid | r | MAE | r | MAE | r | MAE | r | MAE |
| 24 | 0.74 | 0.75 | 0.74 | 0.47 | 0.74 | 0.44 | 0.75 | 0.48 |
| 132 | 0.75 | 0.84 | 0.75 | 0.41 | 0.74 | 0.41 | 0.68 | 0.45 |
| 43 | 0.72 | 0.68 | 0.72 | 0.47 | 0.79 | 0.46 | 0.79 | 0.43 |
| 48 | 0.60 | 0.77 | 0.60 | 0.65 | 0.64 | 0.60 | 0.62 | 0.56 |
| 62 | 0.56 | 1 | 0.56 | 0.58 | 0.64 | 0.52 | 0.69 | 0.57 |
| Mean | 0.67 | 0.81 | 0.67 | 0.52 | 0.71 | 0.49 | 0.71 | 0.50 |
| Median | 0.72 | 0.77 | 0.72 | 0.47 | 0.74 | 0.46 | 0.69 | 0.48 |

The machine learning module 206 received uncompilable code from college seniors majoring in computer science that took a 90 minute assessment in a proctored environment during which they attempted two programming questions. The machine learning module 206 identifies that the uncompilable code addressed five problems and was written in Java. The topics covered by the questions spanned iterative/recursive algorithms, trees, and graphs and other algorithms like the shortest job first, etc. The machine learning module 206 used on average, 143 compilable and 378 uncompilable responses per problem to build and test the machine learning models. In total, 2606 codes were used in the use case.

Two professional software engineers with 4-7 years of experience each shared the task of grading the responses. The engineers followed a rubric defined to score codes on a scale of 1-5. Before beginning the grading exercise, the engineers underwent a one-week workshop where they learned how to interpret the rubric and participated in mock grading exercises. The engineers were given special instructions to score the codes only based on the intended logic of the programmer and not to penalize based on the quantum or type of compilation errors. The correlation between the scores of the two engineers was on an average 0.72 across the questions in the data set.

To determine criteria #1 whether the make compilable method or the rule relaxation method is more accurate in scoring the uncompilable code, the machine learning module 206 trained the machine learning models on the uncompiling codes using each of the make compilable method and the rule relaxation method. The make compilable method failed to correct all the codes. Specifically, the make compilable method was only able to correct 48% of the codes, but performed better than the rule relaxation method on this set. The mean (median) r for the make compilable method was 0.73 (0.74), and it was 0.69 (0.71) for the rule relaxation method (on the make compilable method set). The make compilable method also performed better for three out of the five problems, worse for the fourth, and similar for the fifth. As a result, the make compilable method is better than relaxing grammar. This implies that the code correcting algorithm does extrapolate the user's intent. However, it is unable to do so for 52% of the codes.

The machine learning module 206 also generated machine learning models that used a combination of the make compilable method and the rule relaxation method (RRMC approach). To determine criteria #2 how accurately the uncompilable code can be scored and how it compares to expert scoring engines and/or automatic scoring of compilable codes, the RRMC approach has a mean correlation of 0.71, which is described in the second to last column of Table 3. Only for one problem was the correlation fairly low at 0.62. This shows that the RRMC approach provides competitive results.

The machine learning module 206 also build machine learning models using compilable codes to predict their labels. The accuracy of these models is much higher (on average, 0.85 as compared to 0.71 for uncompilable). This is because the machine learning module 206 has access to a number of test-cases passed for the compilable code. This feature alone provides a correlation of 0.73 on average with expert ratings. Without this feature, the average correlation for compilable code falls to 0.70, comparable to 0.71 of uncompilable code.

The machine learning module 206 does not have access to the test case feature for uncompilable codes. The value of the number of test cases passed feature is 0 for codes that the correction module 202 could not make compilable. The machine learning module 206 uses the number of test cases passed by the compilable program for codes corrected by the make compilable method. Even when the correction module 202 corrects the uncompilable codes, the correction module 202 does not semantically correct them to result in an informative number of test-cases passed.

The machine learning module 206 determined that for criteria #3 a machine learning model trained for compilable codes can be reused for uncompilable codes after normalization. The machine learning module 206 used the RRMC approach to derive features and use the machine learning model learned on compilable codes. This way, the machine learning module 206 does not require additional labelled uncompiled code for building the machine learning model. The first column in Table 3 shows the results of using the machine learning model trained on compilable codes directly. Though the correlation is a little poorer (0.67 compared to 0.71), the MAE is significantly higher (0.81 compared to 0.50).

The machine learning module 206 improved the machine learning model by dropping the number of test-cases passed as a feature in training the machine learning models on compilable code. As discussed above, the number of test-cases passed is not predictive of scores for the uncompilable code in the same way it is for compilable codes.

A comparable correlation and high MAE signals a systematic error. To test this hypothesis, the machine learning module 206 modified the distribution of the model output to match with that of the uncompilable code ratings (on the training set, explained in more detail below). The results in Table 3 show that by flying the distribution, there is a dramatic improvement in the MAE. Specifically, flying the distribution results in a MAE of 0.42 as compared to 0.50 for a machine learning model generated from uncompilable codes. Removing the test case feature resulted in a further improvement where the mean r became 0.71 and MAE 0.49, which is almost the same as models learned on uncompilable codes.

Figure 3:
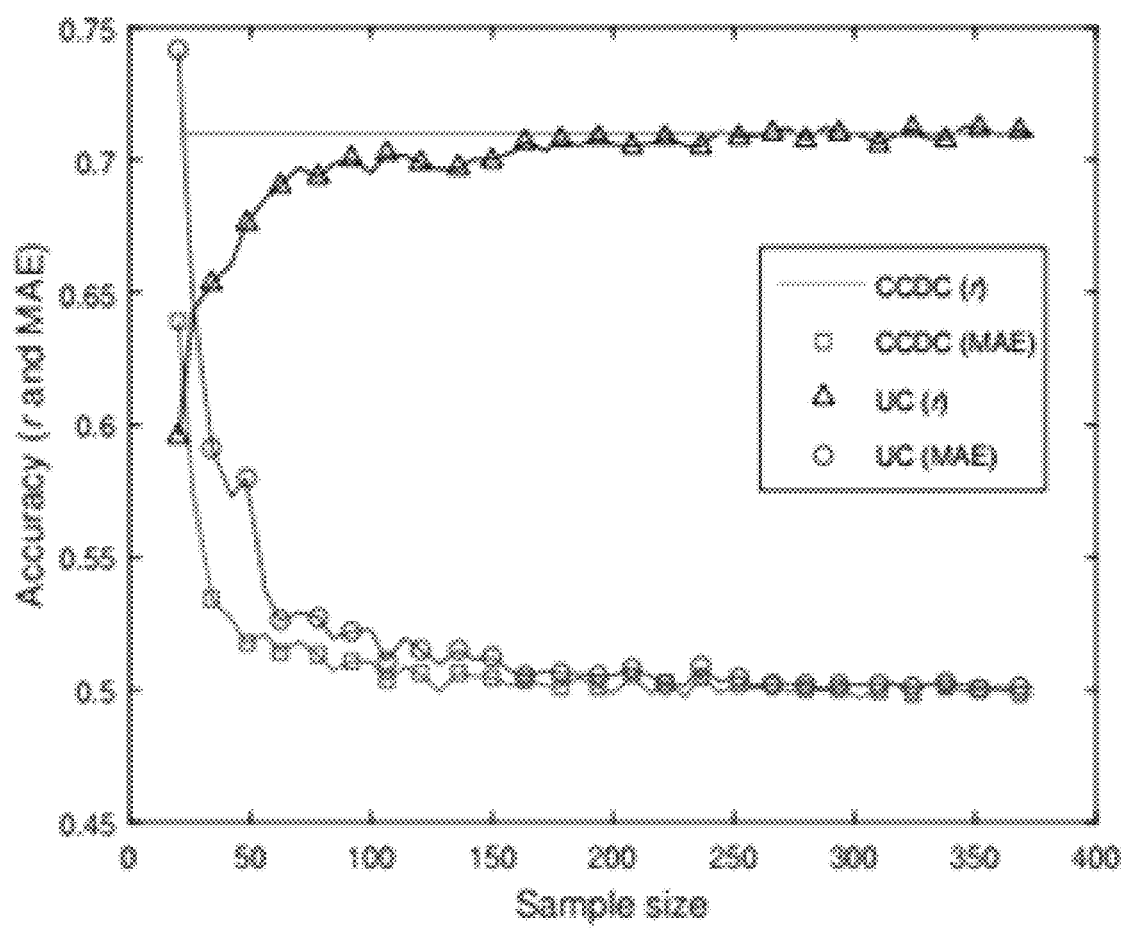
FIG. 3 illustrates the accuracy of machine learning models build on a sample of compilable codes with distribution correction and uncompilable codes according to some embodiments.

The scores predicted by the compilable code models are transformed such that their distribution matches the expert score distribution of the uncompiled code. The machine learning module 206 performs an equipercentile transformation on the training set of the uncompilable code. The equipercentile method is commonly used in test equating. Here, scores with the same percentile on the two distributions are considered equivalent. Scores from one distribution are mapped to the equipercentile score on the other distribution. This suggests that expert scores are needed on the uncompilable code. The machine learning module 206 worked to analyze the hypothesis that distribution matching would require a much smaller sample of labelled codes as compared to building a fresh model. To confirm this, the machine learning module 206 performs a simulation by bootstrapping different sample sizes of labelled uncompilable codes and tests the mean r/MAE for the distribution correction approach (CCDC) vs. building fresh machine learning models for the uncompilable code. The results are show in FIG. 3, which illustrates an example graph 300 of the accuracy of machine learning models build on a sample of compilable codes with distribution correction and uncompilable codes. The x-axis denotes the sample size used and the y-axis denotes accuracy in terms of r and MAE.

The MAE for the distribution correction approach as a function of the sample size reduces much faster as compared to training fresh models. The distribution correction approach has the right r throughout. To attain stability within 1% of MAE and r of the asymptotic accuracy, 140 samples are needed for the distribution correction approach and 220 samples for building fresh models. This means a reduction of about 33% in labeling effort. This becomes significantly large for creating models for multiple programming languages and for multiple raters. For 10 languages and 3 raters, it would lead to rating 2400 additional codes.

The scoring engine 208 generates a score for the uncompilable code based on the machine learning model. In some embodiments, the scoring engine 208 includes a set of instructions executable by the processor 235 to generate the score. In some embodiments, the scoring engine 208 is stored in the memory 237 of the computing device 200 and can be accessible and executable by the processor 235.

In some embodiments, the scoring engine 208 receives compilable code from the correction module 202, extracted features derived from the abstract syntax tree and the symbol table from the parser 204, and a machine learning model from the machine learning module 206. The scoring engine 208 may score the extracted features as compared to high-quality compilable code based on the machine learning model. In some embodiments, the scoring engine 208 scores compilable code on a variety of factors, such as programming ability, programming practices, time complexity, and a total score where the total score is a combination of any other scores generated by the scoring engine 208. The scoring engine 208 may score uncompilable code on a variety of factors as well, including programming ability, programming practices, and a total score but not time complexity. In some embodiments, the scoring engine 208 penalizes uncompilable code so that it does not have the same score as compilable code. For example, the scoring engine 208 may deduct a portion of the total score based on a penalty for the uncompilable code. The scoring engine 208 may instruct the feedback module 210 to provide the user with a score or scores, which the feedback module 210 supplements with additional information.

In some embodiments, the scoring engine 208 maintains a record of a user's (i.e., a programmer's) scores. For example, the scoring engine 208 may generate a user profile that includes the user name, password, security questions, confirmations of disclaimers, etc. The scoring engine 208 may update the user profile with information about all tests taken by the user. The scoring engine 208 may add to the test-taking information all instances where a user provided code including compilable and uncompilable code, the accuracy of corresponding scores, an overall score for the user, etc.

The following is a case study on how the feedback application 103 including the scoring engine 208 was generated and modified for a company that wanted the ability to assess entry level software engineers for jobs. The company was looking to find candidates who can think of a correct algorithmic approach to solve a given programming problem. The scoring engine 208 generated scores for programming ability, programming practices, time complexity, and a total score. The total score is a combination of the scores for programming ability, programming practices, and time complexity. The scoring engine 208 introduced a penalty for non-compilation. This helped score a compilable code higher than uncompilable codes, if they had the same score on all metrics.

A total of 29,600 candidates took the test. Out of these 54% had compilable code, 24% had a blank code, and 22% had uncompilable code. The programming ability score for candidates with compilable and uncompilable codes is shown below in Table 4. The company used a cut-off of 3 or above on the programming ability score to interview candidates. Out of 29,600 candidates, 2,457 candidates were selected for an interview. This was an addition of 26% candidates as compared to a system that would automatically exclude any candidate with uncompilable code. After the interview, 565 selected candidates had uncompilable codes, which results in an additional 19% of hired candidates. As a result of the feedback application 103 with the developed scoring engine 208, the company was able to hire much more efficiently. In addition, many worthy candidates who would have been excluded by a traditional scoring system were hired.

TABLE 4

Distribution of PA scores for candidates with compilable and uncompilable programs. The table also includes the number of candidates selected for interview and the number of candidates who were hired.

| | Rubric Definition | Compilable | Uncompilable |
|---|---|---|---|
| 1 | Code unrelated to given problem | 3361 | 1979 |
| 2 | Appropriate keywords and tokens are present | 3264 | 2125 |
| 3 | Right control structure exists with missing data dependency | 2547 | 1440 |
| 4 | Correct with inadvertent errors | 2955 | 1017 |
| 5 | Completely correct | 3828 | — |
| ≥3 | Selected for interview | 9330 | 2457 |
| — | Hired | 2986 | 565 |

Table 5 below shows a couple of examples of the uncompiled code used by hired candidates. One observes that the logic of the uncompilable code is correct, but they do not compile due to incorrect declaration or use of data types. Another error is the wrong placement of return with respect to parentheses. Based on the analysis it was determined that candidates with near-correct codes (semantically) make compilation errors due to lack of knowledge of using the language. They also sometimes are unable to debug silly errors. One reason for this could be that compiler generated error messages are not instructive enough to correct the errors.

TABLE 5

Examples of candidate submissions with uncompiling codes who got hired.

Program 1

Input: String
Expected output: String without vowels

```
1   Class Solution
2   {
3   public static String vowel( String st )
4   {
5       char strChar[ ]= st . toCharArray ( ) ;
6       String rev= "";
7       for( int i=0;i<st . length ( ) ; i ++){
8           if(st.charAt(i)=="a" || st.charAt(i)=="A"){
9               rev=rev+ "";
10          }else if(st.charAt(i)=="e" || st.charAt(i)=="E"){
11              rev=rev+ "";
12          }else if(st.charAt(i)=="i" || st.charAt(i)=="I"){
13              rev=rev+ "";
14          }else if(st.charAt(i)=="o" || st.charAt(i)=="O"){
15              rev=rev + "";
16          }else if(st.charAt(i)=="u" || st.charAt(i)=="U"){
17              rev=rev+ "";
18          } else {
19              rev=rev+st . charAt(i) ;
20          }
21          return rev ;
22      }
23  //Missing return statement
24  }
25  }
```

Compiler Errors
Lines 8, 10, 12, 14, 16: Incomparable types char and String
Line 23: Missing return statement
Actual corrections to be made
Lines 8, 10, 12, 14, 16: Replace " with '
Line 23: Include return statement in the main block Program 2

Input: String
Expected output: 1 if the brackets are balanced, otherwise 0

```
1   public class Parentheses
2   {
3       public static int brackets ( String str )
4       {
5           Stack<char> s=new Stack<char>( );
6           for( int i=0; i<str . length ( ) ; i++){
7               char st = str . charAt(i);
8               if ( st == ' ( ' || st== ' { ' || st== ' [ ' )
9                   s. push( str . charAt (i));
10              if ( s. empty ( ) ) {
11                  s . push(str . charAt (i) ) ;
12                  continue ;
13              } else {
14                  char cur= s.top( );
15                  if ( str== ' ) ' && cur == ' ( ' ) {
16                      s . pop( ) ;
17                  } else if ( st== ' } ' && cur == ' { ' ) {
18                      s . pop( ) ;
19                  } else if ( st== ' ] ' && cur == ' [ ' ) {
20                      s . pop( ) ;
21                  }
22              }
23          }
24          if (! s . empty ( ) )
25              return 0;
26          return 1;
27      }
28  }
```

Compiler Errors
Line 5: Unexpected type char
Line 16: Undefined symbol top.
Actual corrections to be made
Line 5: Replace char with Character
Line 16: Replace top( ) with peek( )

The feedback module 210 generates feedback on a programmer's uncompilable code. In some embodiments, the feedback module 210 includes a set of instructions executable by the processor 235 to generate the feedback. In some embodiments, the feedback module 210 is stored in the memory 237 of the computing device 200 and can be accessible and executable by the processor 235.

In some embodiments, the feedback module 210 receives one or more scores from the scoring engine 208 and generates semantic feedback based on the one or more scores. The scoring engine 208 may provide scores for programming ability, programming practices, time complexity (if the code is compilable), and a total score where one or more of the scores included a penalty for the code being uncompilable. The feedback module 210 may generate graphical data for displaying the one or more scores and the semantic feedback where the semantic feedback includes the score and a description of one or more of logical correctness of the uncompilable code, an algorithmic approach used by the uncompilable code, a programming style of the uncompilable code, a maintainability of the uncompilable code, a recommendation for how to correct logic of the uncompilable code, correct code, a number of compiler errors, a number of test cases, a recommendation to make the uncompilable code compilable, or an identification of one or more lines in the uncompilable code that are uncompilable and one or more alternate lines to correct the uncompilable code.

The feedback module 210 may determine areas of improvement for the programmer and generate graphical data for displaying feedback that includes recommendations to the programmer about areas of improvement. In some embodiments, the feedback module 210 may recommend that the programmer take particular kinds of programming problems specific to the area that needs improvement. The feedback module 210 may also recommend additional resources for improving scores, such as a third-party web site for personal tutoring.

Example Methods

Figure 4:
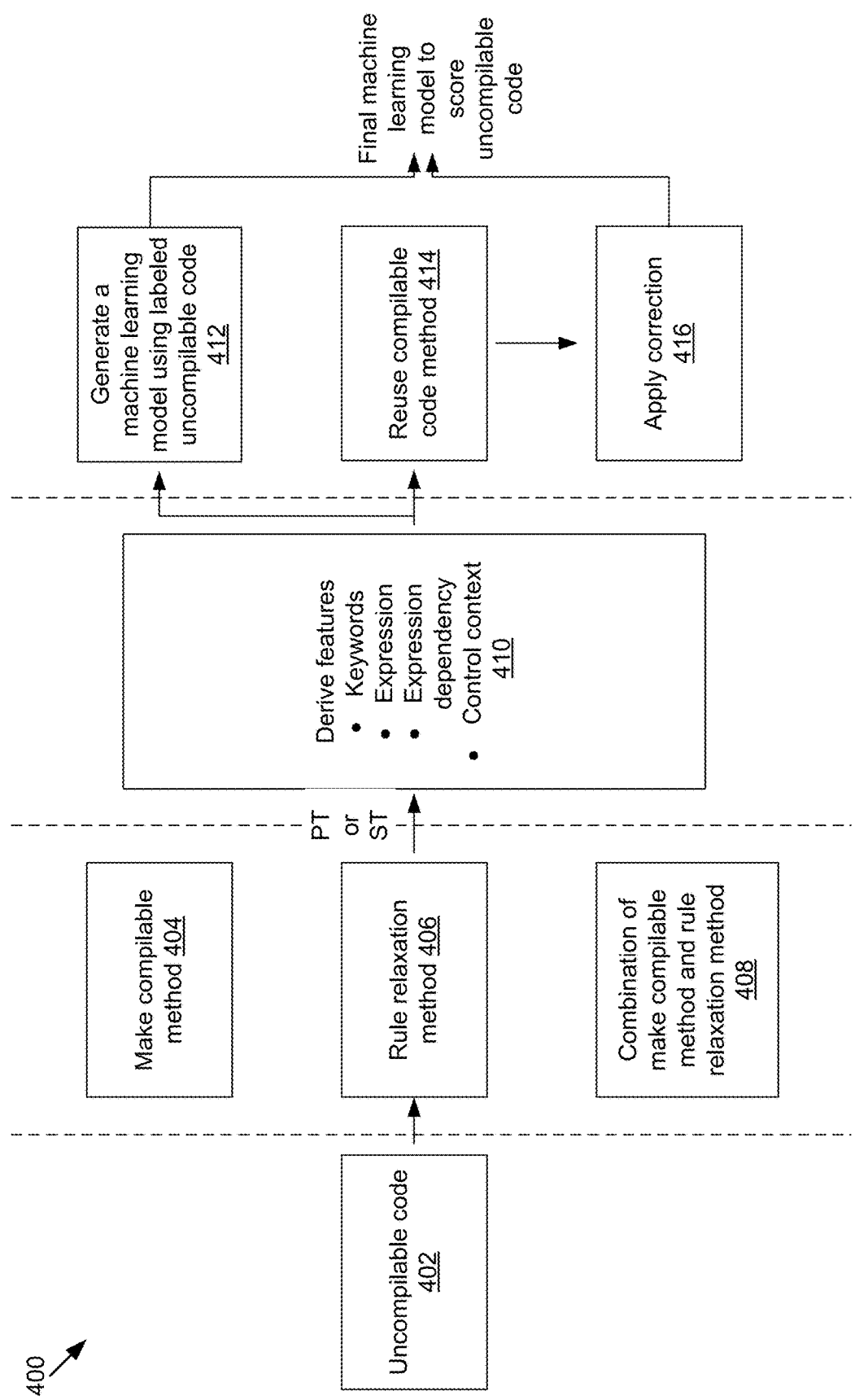
FIG. 4 illustrates a flowchart of an example method to create a machine learning model to analyze uncompilable code according to some embodiments.

FIG. 4 illustrates a flowchart of an example method 400 to create a machine learning model to analyze uncompilable code according to some embodiments. The method 400 may be performed by a feedback application 103a stored on a correction server 101, a feedback application 103b stored on a user device 115, or a feedback application 103 stored in part on the correction server 101 and in part on the user device 115.

At step 402, the feedback application 103 receives uncompilable code from a programmer. There are three different ways to process the uncompilable code: either apply the make compilable method, apply the rule relaxation method, or apply a combination of the make compilable method and the rule relaxation method. At step 404, a compilable method is applied. In some embodiments, the compilable method (1) corrects syntax errors, such as by inserting a semicolon that was missed in the code; and (2) applies an n-gram based token prediction model to correct a line of code. At step 406, a rule relaxation method is applied. The rule relaxation method may (1) generate an abstract syntax tree and a symbol table to extract features from the uncompilable code and identify correct statements in the uncompilable code; (2) accept or reinterpret grammatically incorrect statements; and (3) skip the grammatically incorrect statements that are not parseable. At step 408, a combination of the make compilable method and the rule relaxation method are applied.

At step 410, features are derived from the uncompilable code. For example, the parse tree or a symbol table are used to derive the features from the uncompilable code. The features include descriptions of keywords, expressions, expression dependency, and control context.

There are two different ways to generate a machine learning model. At step 412, a machine learning model is generated using labeled uncompilable code. The machine learning model may be processed to generate a final machine learning model that is used to score uncompilable code. At step 414, a reuse compilable code method is applied, which uses labelled compilable code. At step 416, a correction is applied to the labeled compilable code to make it suitable for the uncompilable code. For example, the machine learning model may be normalized to make it suitable for the uncompilable code. Once the correction is applied, a final machine learning model is used to score uncompilable code.

Figure 5:
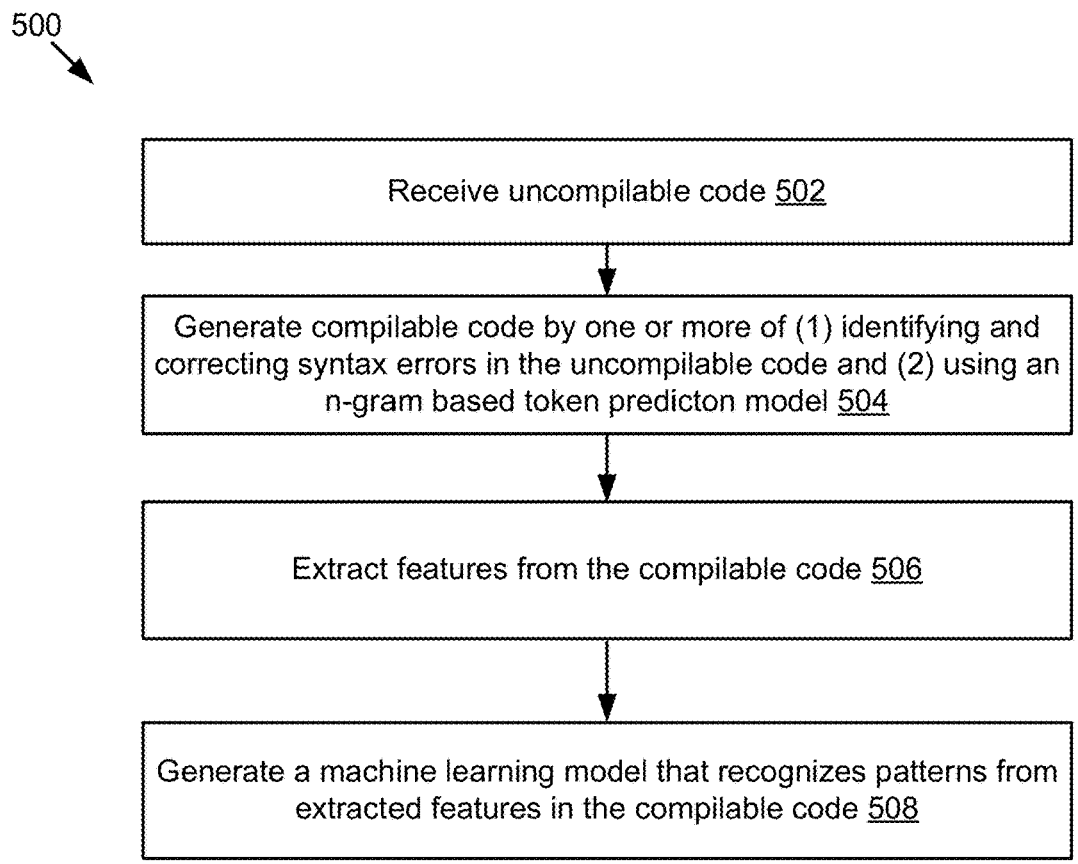
FIG. 5 illustrates a flowchart of an example method to generate compilable and/or parseable code from uncompilable code according to some embodiments.

FIG. 5 illustrates a flowchart of an example method 500 to generate compilable code from uncompilable code according to some embodiments. The method 500 may be performed by a feedback application 103a stored on a correction server 101, a feedback application 103b stored on a user device 115, or a feedback application 103 stored in part on the correction server 101 and in part on the user device 115.

At step 502, uncompilable code is received. For example, uncompilable code is received from a programmer. At step 504, compilable code is generated by or more of (1) identifying and correcting syntax errors in the uncompilable code and (2) using an n-gram based token prediction model. At step 506, features are extracted from the compilable code. At step 508, a machine learning model is generated that recognizes patterns from extracted features in the compilable code.

Figure 6:
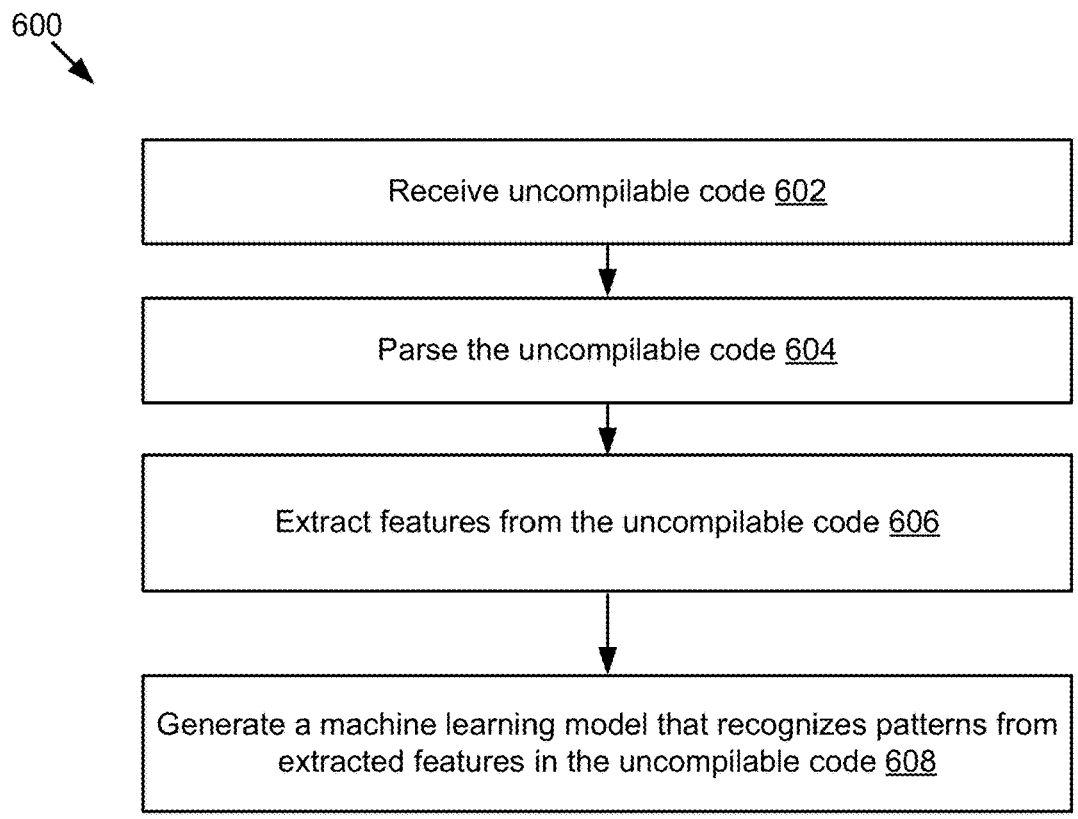
FIG. 6 illustrates a flowchart of an example method to parse uncompilable code and extract features from the uncompilable code according to some embodiments.

FIG. 6 illustrates a flowchart of an example method 600 to parse uncompilable code and extract features from the uncompilable code according to some embodiments. The method 600 may be performed by a feedback application 103a stored on a correction server 101, a application 103b stored on a user device 115, or a feedback application 103 stored in part on the correction server 101 and in part on the user device 115.

At step 602, uncompilable code is received. At step 604, the uncompilable code is parsed. For example, the uncompilable code is parsed by clearing syntax errors, relaxing parsing rules of the compiler, or ignoring unparseable statements. At step 606, features are extracted from the uncompilable code. At step 608, a machine learning module that recognizes patterns from extracted features in the uncompilable code is extracted.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method comprising:
receiving uncompilable code from a user, wherein the uncompilable code is provided by the user as a response to at least one of multiple tests;
generating compilable code by (1) identifying and correcting syntax errors in the uncompilable code and (2) using an n-gram based token prediction model, wherein using the n-gram based token prediction model includes:
determining whether a first statement in the uncompilable code has a compiler error or is uncompilable, wherein a determination is performed by at least one of a machine learning model or a compiler that identifies a line that includes the first statement;
predicting a corrected statement based on other statements in the uncompilable code; and
responsive to the corrected statement making the uncompilable code compilable, accepting the corrected statement;
applying a rule relaxation technique to the uncompilable code to generate a parse tree or a symbol table (ST) from the uncompilable code;
extracting features from the compilable code and the uncompilable code based on the rule relaxation technique;
generating the machine learning model that recognizes patterns from extracted features in the compilable code and the uncompilable code;
generating a score based on the machine learning model, wherein the score is based on programming ability and programming practices;
generating semantic feedback that includes the score, wherein the semantic feedback describes how correct a logic of the uncompilable code is in solving a problem; and
generating a user profile that includes the score of the uncompilable code using the extracted features as part of a set of scores for the multiple tests.

2. The method of claim 1, wherein the machine learning model is a third machine learning model, determining whether the first statement in the uncompilable code has a compiler error is performed by a first machine learning model, and predicting the corrected statement is performed by a second machine learning model.

3. The method of claim 1, wherein the score is further based on one or more of a time complexity or a total score.

4. The method of claim 1, wherein the parse tree or the ST is created from the uncompilable code, the rule relaxation technique is used to accept or reinterpret grammatically incorrect statements, and the grammatically incorrect statements that are not parseable are skipped.

5. The method of claim 1, wherein the extracted features describe one or more keywords, expressions, expression dependency, or control context.

6. The method of claim 1, wherein the machine learning model is generated by labeling the compilable code or comparing the extracted features in the compilable code to labeled high-quality compilable code.

7. The method of claim 1, further comprising:
identifying the user as a job candidate based on the score meeting a threshold.

8. The method of claim 1, wherein the semantic feedback further includes a description of one or more of logical correctness of the uncompilable code, an algorithmic approach used by the uncompilable code, a programming style of the uncompilable code, a maintainability of the uncompilable code, a recommendation for how to correct logic of the uncompilable code, correct code, a number of compiler errors, a number of test cases, a recommendation to make the uncompilable code compilable, or an identification of one or more lines in the uncompilable code that are uncompilable and one or more alternate lines to correct the uncompilable code.

9. The method of claim 1, wherein the machine learning model is initially generated from labeled high-quality compilable code and reused for the uncompilable code.

10. A non-transitory computer storage medium with instructions stored thereon that, when executed by one or more computers, cause the one or more computers to perform operations, the operations comprising:
receiving uncompilable code from a user, wherein the uncompilable code is provided by the user as a response to at least one of multiple tests;
generating compilable code by (1) identifying and correcting syntax errors in the uncompilable code and (2) using an n-gram based token prediction model, wherein using the n-gram based token prediction model includes:
determining whether a first statement in the uncompilable code has a compiler error or is uncompilable, wherein a determination is performed by at least one of a machine learning model or a compiler that identifies a line that includes the first statement;
predicting a corrected statement based on other statements in the uncompilable code; and
responsive to the corrected statement making the uncompilable code compilable, accepting the corrected statement;
applying a rule relaxation technique to the uncompilable code to generate a parse tree or a symbol table (ST) from the uncompilable code;
extracting features from the compilable code and the uncompilable code based on the rule relaxation technique;
generating the machine learning model that recognizes patterns from extracted features in the compilable code and the uncompilable code;
generating a score based on the machine learning model, wherein the score is based on programming ability and programming practices;
generating semantic feedback that includes the score, wherein the semantic feedback describes how correct a logic of the uncompilable code is in solving a problem; and
generating a user profile that includes the score of the uncompilable code using the extracted features as part of a set of scores for the multiple tests.

11. The computer storage medium of claim 10, wherein the score is further based on one or more of a time complexity or a total score.

12. The computer storage medium of claim 10, wherein the parse tree or the ST is used to identify correct statements in the syntactically corrected code, use the rule relaxation technique to accept or reinterpret grammatically incorrect statements, and skip the grammatically incorrect statements that are not parseable.

13. The computer storage medium of claim 10, wherein the semantic feedback further identifies areas of improvement for the user and recommends particular kinds of programming problems specific to the areas of improvement.

14. The computer storage medium of claim 13, wherein the semantic feedback further includes a description of one or more of logical correctness of the uncompilable code, an algorithmic approach used by the uncompilable code, a programming style of the uncompilable code, a maintainability of the uncompilable code, a recommendation for how to correct logic of the uncompilable code, correct code, a number of compiler errors, a number of test cases, a recommendation to make the uncompilable code compilable, or an identification of one or more lines in the uncompilable code that are uncompilable and one or more alternate lines to correct the uncompilable code.

15. A system comprising:
one or more processors; and
a memory that stores instructions that, when executed by the one or more processors, cause the one or more processors to perform operations comprising:
receiving uncompilable code from a user, wherein the uncompilable code is provided by the user as a response to at least one of multiple tests;
generating compilable code by (1) identifying and correcting syntax errors in the uncompilable code and (2) using an n-gram based token prediction model, wherein using the n-gram based token prediction model includes:
determining whether a first statement in the uncompilable code has a compiler error or is uncompilable, wherein a determination is performed by at least one of a machine learning model or a compiler that identifies a line that includes the first statement;
predicting a corrected statement based on other statements in the uncompilable code; and
responsive to the corrected statement making the uncompilable code compilable, accepting the corrected statement;
applying a rule relaxation technique to the uncompilable code that generates a parse tree or a symbol table (ST) from the uncompilable code;
extracting features from the compilable code and the uncompilable code based on the rule relaxation technique;
generating the machine learning model that recognizes patterns from extracted features in the compilable code and the uncompilable code;
generating a score based on the machine learning model, wherein the score is based on programming ability and programming practices;
generating semantic feedback that includes the score, wherein the semantic feedback describes how correct a logic of the uncompilable code is in solving a problem; and
generating a user profile that includes the score of the uncompilable code using the extracted features as part of a set of scores for the multiple tests.

16. The system of claim 15, wherein the score is further based on one or more of programming ability, a programming practice, a time complexity, or a total score.

17. The system of claim 16, wherein the operations further comprise:

identifying the user as a job candidate based on the score.

18. The system of claim 15, wherein the machine learning model is generated by labeling the compilable code or comparing the extracted features in the compilable code to labeled high-quality code.

* * * * *